United States Patent [19]
Walters et al.

[11] 4,082,939
[45] Apr. 4, 1978

[54] VEHICULAR COFFEE HEATER

[75] Inventors: Adolbert F. Walters, c/o George Spector, 3615 Woolworth Bldg., 233 Broadway, New York, N.Y. 10007; George Spector, New York, N.Y.

[73] Assignee: Adolbert Fitzgerald Walters, Brooklyn, N.Y.

[21] Appl. No.: 516,972

[22] Filed: Oct. 22, 1974

[51] Int. Cl.² .................. H05B 1/02; A47C 7/62; A47F 5/08

[52] U.S. Cl. .................. 219/202; 211/106; 219/386; 219/432; 219/438

[58] Field of Search .............. 219/202, 385, 386, 387, 219/429, 432, 433, 435, 436, 438, 437, 520, 521; 211/106; 297/188, 191

[56] References Cited
U.S. PATENT DOCUMENTS

| | | | |
|---|---|---|---|
| 2,672,988 | 3/1954 | Johnson | 211/106 X |
| 2,861,171 | 11/1958 | Adler | 219/432 X |
| 3,423,571 | 1/1969 | Trachtenberg et al. | 219/202 X |
| 3,539,773 | 11/1970 | Wilson | 219/432 |
| 3,586,099 | 6/1971 | Collie | 219/202 X |
| 3,692,975 | 9/1972 | Markus et al. | 219/202 |

FOREIGN PATENT DOCUMENTS

| | | | |
|---|---|---|---|
| 277,789 | 9/1914 | Germany | 219/429 |

*Primary Examiner*—A. Bartis

[57] ABSTRACT

A vehicular coffee heating device adapted to be safely carried in a motor vehicle a collapsible wire rack having hooks engaging the top of a vehicle seat backrest and a basket portion at the rear of the backrest which snugly receives a case having an openable top. An electrically heated coffee vessel is pivotally mounted on a pivoted arm within the case whereby the vessel can be moved through the openable top from a storage position within the case to a pouring position outside of the case.

2 Claims, 6 Drawing Figures

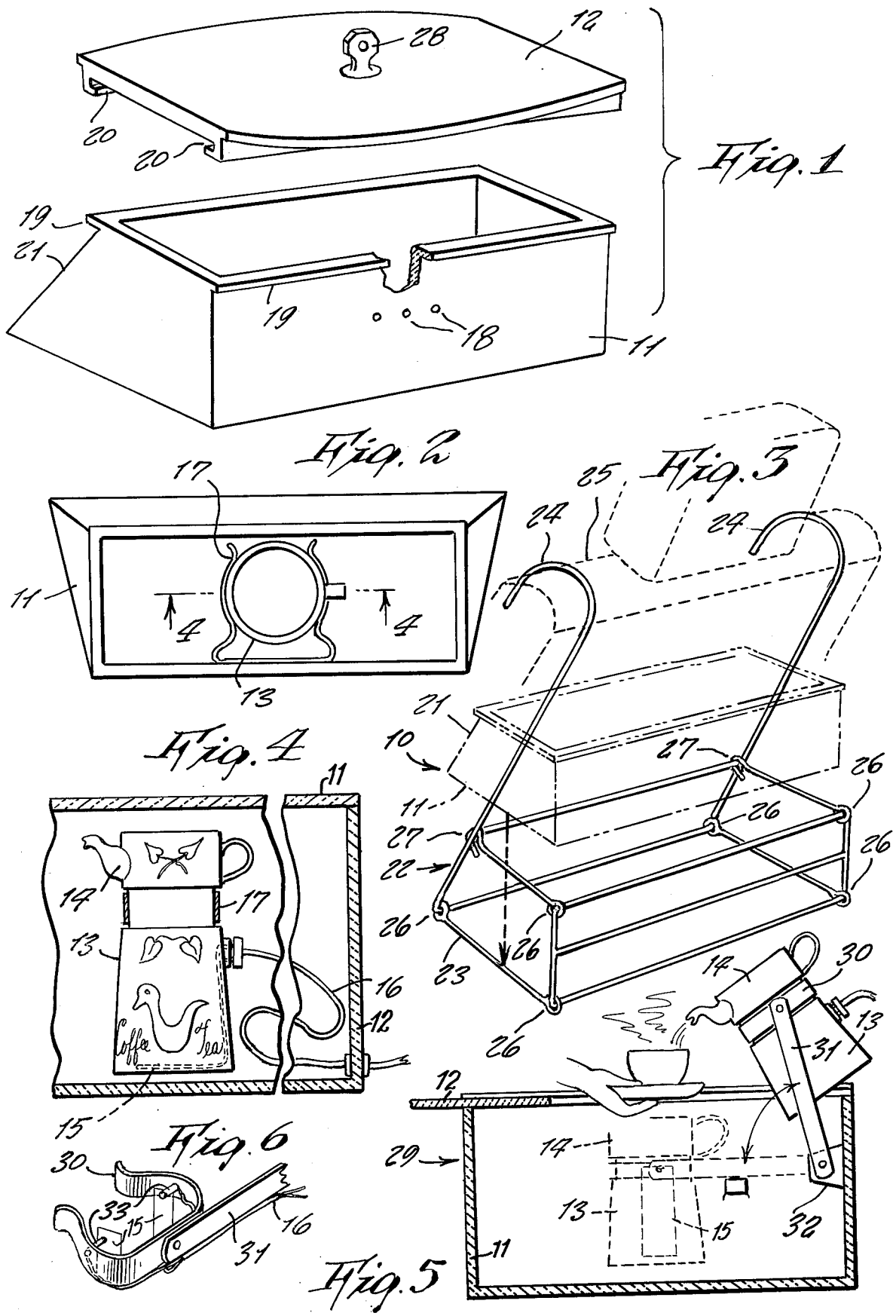

VEHICULAR COFFEE HEATER

This invention relates generally to vehicular accessories. More specifically it relates to electric applicances for automobiles.

SUMMARY OF THE INVENTION

This invention provides a safe, effective and efficient apparatus for transporting an electric appliance such as a coffee maker in a passenger vehicle comprising a rack which fits snugly over the seat backrest and which provides a basket to receive an insulated case for the coffee maker. A special hinged bracket is provided which fastens on to the coffee maker for securing it and for manual upward movement to a raised position for pouring purposes.

A principle object of the present invention is to provide a coffee heater that is designed particularly for installation within an automobile in order that persons may prepare and drink coffee at any time while they are traveling.

Another object is to provide a coffee heater which may be located within the automobile where it may conveniently serve coffee to the car occupants.

Another object is to provide a coffee heater wherein the coffee will remain hot for a very long time after being made, so that a good cup of coffee is always available.

Still another object is to provide a coffee heater which, when not in use, can be conveniently stowed away under a car seat so to be always handy for use.

Other objects are to provide a vehicular coffee heater which is simple in design, inexpensive to manufacture, rugged in construction, easy to use and efficient in operation.

These and other objects will be readily evident upon a study of the following specification and the accompanying drawing wherein:

FIG. 1 is a perspective view of the case and cover shown separated.

FIG. 2 is a top view of the case.

FIG. 3 is a perspective view of a wire rack for holding the case and cover in a car.

FIG. 4 is a cross section on line 4—4 on FIG. 2.

FIG. 5 is a side cross section of a modified design of the invention in which the pot clamp is pivotally attached on a pivotable arm that allows the pot to be swung up and tilted so to pour, and which then swings down to the position shown in dotted lines, thus eliminationg unclamping the pot, and being quicker and easier to use.

FIG. 6 shows a modified pot clamp that includes electric contacts for engaging the heating coil system inside the pot.

Referring now to the drawings in detail, and more particularly to FIGS. 1 to 4 at this time, the reference numeral 10 represents a vehicular coffee heater according to the present invention wherein there is a case 11 closable by a sliding cover 12, and which are made of a thermal insulating material such as styro-foam or the like, so that a coffee maker 13 may be retained hot therewithin. The coffee-maker may comprise a kettle 14 that may either include a built-in electric heater 15 or which may receive an immersible heater therewithin, and which may be connected to an electric extension cord 16 that can be plugged into a cigarette lighter of the vehicle so to heat the water and brew the coffee.

To prevent the coffee maker from tipping over within the case, and spilling the coffee, it can be releasably held in a clip 17 secured by rivets 18 to a side of the case.

The case includes tongues 19 along each side wall upper edge so to slide in corresponding grooves 20 formed on the underside of the cover. As shown, the case may be wider on its bottom by including a slopping wall 21, so that it will not tip over if placed upon a car floor, or which otherwise conforms to a slope of a car front seat backrest in case it is supported against a rear side thereof by a wire rack 22.

The wire rack includes a wire basket 23, into which the case 11 is placable, and a pair of wire hooks 24 for hooking over a top edge of a front seat backrest 25. As shown in FIG. 3, it will be noted that due to pivotal connections 26 at the basket corners and due to snap hooks 27, the basket can be opened so to remove the case 11 and the wire rack will thus collapse into a relatively flat condition in order that it takes up a minimum space when stored away.

Thus, in operative use, an automobile traveler can get a good cup of coffee at any time while traveling because it is kept hot inside the insulated case. To get a drink, a person simply grasps cover handle 28, slides the cover to one end, removes a cup (that may be stored inside the case together with other related objects such as spoons, sugar and powdered cream), then removes the coffee maker from the retaining clip and pours out the coffee.

In FIGS. 5 and 6, a modified design 29 of the invention incorporates generally the same construction as described above, except that the coffee maker does not have to be unclipped from the clip each time that the coffee maker has to be lifted in order to pour out a cup of coffee. In this form of the invention, the coffee maker is firmly retained in a clip 30 which is pivotally connected to an arm 31 pivotable at one end about a lug 32 formed within one end of the case, so that the coffee maker can be lifted upward out of the case and pour out a cup of coffee without disengagement with the clip, as shown in FIG. 5. Thus the coffee maker is secured against tipping over when in the case, and which requires less effort in order to pour out coffee. A lug 33 in the case serves as a rest for the arm so as shown in FIG. 6, electric contact pins 33 may be incorporated on the clip for electrically contacting a built-in heater within a coffee maker having contacts on opposite sides so to engage the pins.

Thus a modified design is provided.

While various changes may be made in the detail construction, it is understood that such changes will be within the spirit and scope of the present invention as is defined by the appended claims.

What is claimed is:

1. The combination of a vehicular coffee heater, carrying case and a wire basket rack for supporting the case on a seat back rest, wherein the rack comprises a collapsible basket and integral spaced rear members forming part of and extending from the rear side of the basket, said members extending upwardly vertically inclined to upper ends having hooks thereat for engaging to the top of the backrest, said members being pivotally connected at their lower end to the bottom and sides of the basket, said basket being formed of hinged wires whereby the wires are pivotable to a flat collapsed position, in combination with a case having an inclined rear wall conforming to the inclination of the said members, said case being dimensioned to fit snugly within the basket when said basket is open, in further combination with an electrically heated coffee vessel adapted to fit in said case, including a bracket on said vessel and a laterally sliding cover mounted over a top opening in said case to close said opening and provide access to said case and vessel including an arm pivotally secured to the bracket at one end and to the case at the other end, for pivoting movement of the arm from a horizontal position in the case to vertically upward position wherein a portion of said arm and the attached bracket extends out of said case, whereby the vessel is within said case when said arm is in the horizontal position and the vessel can be raised outside of said case for pouring when the arm is vertically upward.

2. The combination as in claim 1 wherein the vessel includes an electric heater with terminals exposed at the vessel exterior at the region where said bracket is mounted said bracket including spaced electric contacts extending inwardly from the bracket adapted to make electrical contact with said terminals on the vessel when the bracket is secured on the vessel, said contacts being connected to an electric power sorce.

* * * * *